July 6, 1948.    W. H. VAN BUREN    2,444,903
PROCESS OF VULCANIZING
Filed March 22, 1945
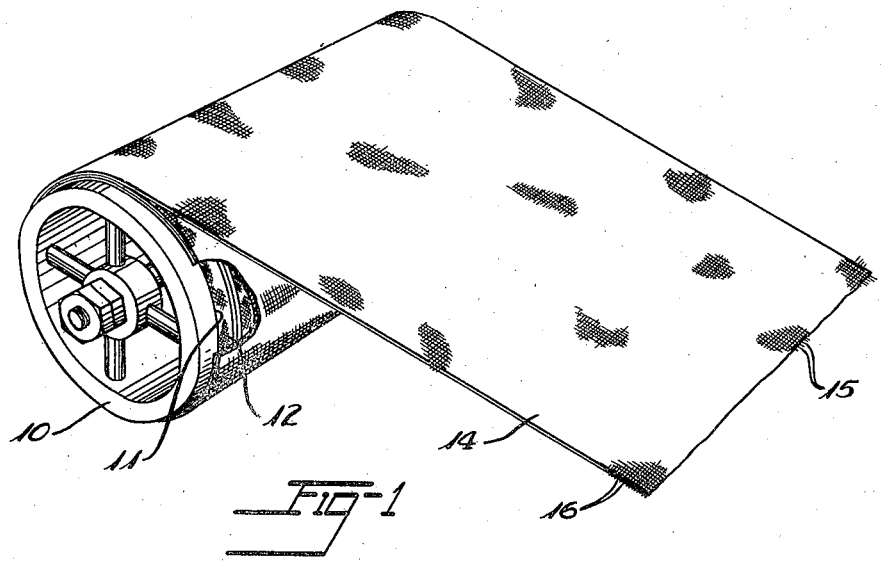
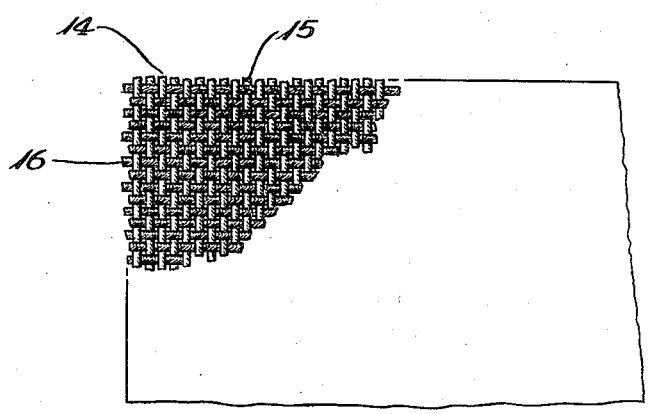
Inventor
Walter H. Van Buren Patented July 6, 1948

2,444,903

UNITED STATES PATENT OFFICE 2,444,903

PROCESS OF VULCANIZING

Walter H. Van Buren, Philadelphia, Pa., assignor to The B. F. Goodrich Company, New York, N. Y., a corporation of New York Application March 22, 1945, Serial No. 584,202

2 Claims. (Cl. 18—53)

This invention relates to a process of vulcanizing and is especially useful in the vulcanization of rubber articles such as belts, although the invention may be employed for applying pressure in veneering and other operations where flexible tensioned sheet materials are employed for applying pressure during a processing operation.

In the vulcanization of many articles such as endless belts, hose, tire bands and the like, wrappers such as sheets or bands of cotton fabric have been applied under tension about the unvulcanized article supported by a drum, mold, core, or mandrel and the wrapping has been kept in place while the article was exposed to heated gases, such as air or steam, to vulcanize the article. With such wrappers it has been difficult or impossible to obtain the desired high degree of tension, especially with wide wrappers which have required great force to apply the tension.

It is desirable in the vulcanization of some articles to employ a wrapper such that contraction of the wrapper during vulcanization will produce a tensioning force. However, if the contraction takes place both longitudinally of the wrapper, that is circumferentially of the article, and laterally of the wrapper, the lateral contraction will in some cases produce objectionable results. This is the case, for example, in the vulcanization of endless V-belts where the belts are assembled in parallel radially open grooves of a mold or drum and the exposed portions are bound against the mold by a wide wrapper. In such cases the lateral contraction of the wrapper tends to tilt the belts in the outermost grooves while circumferential shrinkage may be insufficient to hold the belts in the grooves against such tilting, resulting in defective belts.

It is an object of the invention to provide a wrapper having a high degree of contraction in the circumferential direction under the conditions of vulcanization of the article or articles, while the wrapper at the same time has a low degree of contraction in the lateral direction under the same conditions.

Further objects are to provide a higher degree of circumferential tension than has been obtained with prior wrappers; to provide for circumferential tension by contraction of the wrapper under the temperatures of vulcanization; and to provide for increased convenience of operation, durability of the wrapper, and increased uniformity in the high quality of the products.

These and other objects will appear from the following description and the accompanying drawing.

Of the drawing,

Fig. 1 is a perspective view of a curing drum for V-belts having a plurality of belts thereon and showing the wrapper of the invention partly wound thereon, parts being broken away.

Fig. 2 is a plan view of a portion of the wrapper constructed in accordance with and embodying the invention.

Referring to the drawings, which show an illustrative application of the invention, the numeral 10 designates a curing drum for vulcanizing endless V-belts. The drum is formed of separable mold rings defining therebetween spaced-apart parallel circumferential grooves 11 in which unvulcanized V-belts 12 are located. For confining the belts in the grooves, and applying pressure thereto during the vulcanizing or curing operation, a cloth wrapper 15 is wound about the face of the drum under tension over the belts in a plurality of convolutions.

During vulcanization, which is accomplished by placing the drum in an open steam vulcanizer and exposing the belts to heat, the wrapper, in accordance with the invention, tends to contract substantially in the circumferential direction, and by the tension thus developed applies pressure to the belts to form them in the grooves and to provide them with a smooth outer periphery by contact with the wrapper.

To provide against lateral contraction of the wrapper and at the same time provide for high circumferential contraction thereof, the wrapper is constructed of a substantially square-woven fabric such as that illustrated in Fig. 2 in which the warp threads 15 applied circumferentially of the drum, are of a material such as nylon, which has the property of contracting substantially under the heat of the vulcanizing chamber, whereas the lateral or filler threads 16 applied axially of the drum, are preferably of material, such as cotton, which is affected to a relatively small degree by heat. The nylon material has been found in use to contract by a much greater amount when heated than cotton material, providing substantially greater circumferential contraction than lateral contraction in the wrapper so constructed thereby applying great pressure radially of the drum to the belts thereon, while forces acting axially of the drum due to any tendency for contraction of the filler threads are relatively small and not sufficient to damage the belts by turning them laterally in the grooves of the drum.

In use, the wrappers may be wetted before applying them about the drum under tension and while some drying of the fabric takes place when the wrapper is in the vulcanizer where it is in contact with steam it is probable that little drying of the wrapper takes place in the vulcanizer. Before the vulcanized belts with the drum and wrapper are removed from the vulcanizer, water may be turned into the vulcanizer to cool the drum and the belts. The drum may then be removed from the vulcanizer and the wet wrapper removed, whereupon the wrapper is ready for reuse.

While all the reasons for the superior results obtained by the use of a wrapper constructed as herein described may not be fully understood, it appears that the explanation may result at least in part from the fact that cotton cords or other elements expand laterally and shrink longitudinally when wetted due to absorption of water, whereas nylon cords or other elements do not expand laterally or shrink longitudinally to such a high degree when wetted, apparently because the nylon is more impervious to moisture. Also, as the wrapper is as wet when wound as it is at any time afterwards, any shrinking of the cotton filler elements has taken place prior to wrapping on the drum, and any drying due to contact with steam at elevated temperatures, which would result in elongation of the filler elements, will have no effect upon the belts in the grooves such as to tip them. The nylon warp elements apparently undergo little change in length due to wetting and drying but, on the other hand, it has been found that the nylon elements if tensioned at one temperature, when subjected to a higher temperature while still tensioned will tend to contract a considerable amount in length. Cotton elements under similar treatment will also contract but by a greatly lesser amount. Tests have shown the contraction of a nylon element to be about six-tenths percent change for 100° F. rise in temperature whereas with cotton elements the change is less than one-tenth percent and as low as about six one-hundredths percent for the same increase in temperature. It is found that when a drum wrapped with the wet wrapper of the invention is placed in the vulcanizer in the presence of steam, where the temperature is about 300° F., the nylon elements of the wrapper which extend circumferentially of the drum are sharply tensioned by tendency to contract, providing greater molding pressure, while the previously wetted filler elements of cotton which extend axially of the drum, are contracted very little if any at all after wetting by the rise in temperature or the presence of steam so that the wrapper does not change in width materially.

The superior tensile strength of nylon over cotton contributes to the great and lasting strength of the wrapper in a direction circumferential of the drum and permits high tensioning of the wrapper, and the high resistance of nylon to mildew contributes to its long life.

Variations may be made without departing from the scope of the invention as it is defined by the following claims.

I claim:

1. The method of vulcanizing material upon an annular form which comprises the steps of providing a pressure-applying wrapper having warp threads of nylon and weft threads of cotton, winding the wrapper about the material upon the form with said warp threads extending circumferentially of the form, and then contracting the nylon warp threads of the wrapper upon the material on the form by subjecting the same to the heat of vulcanization.

2. The method of vulcanizing a plurality of endless V-belts upon an annular form which comprises the steps of winding upon said V-belts upon the form a pressure-applying wrapper of a width to cover the axial extent of the V-belts upon the form and having a plurality of warp threads of nylon extending in the circumferential direction about the form and a plurality of weft threads of cotton in the axial direction of the form, and then contracting the nylon warp threads of the wound wrapper upon the belts by subjecting the same to the heat of vulcanization.

WALTER H. VAN BUREN.

REFERENCES CITED

The following references are of record in the file of this patent:

UNITED STATES PATENTS

| Number | Name | Date |
| --- | --- | --- |
| 1,424,386 | Stoner | Aug. 1, 1922 |
| 2,088,470 | Freedlander | July 27, 1937 |
| 2,130,948 | Carothers | Sept. 20, 1938 |
| 2,238,098 | Bradshaw | Apr. 15, 1941 |
| 2,298,071 | Smith | Oct. 6, 1942 |